United States Patent
Li et al.

(10) Patent No.: US 12,423,822 B2
(45) Date of Patent: Sep. 23, 2025

(54) METHOD AND APPARATUS WITH OPTIMIZATION AND PREDICTION FOR IMAGE SEGMENTATION

(71) Applicant: Samsung Electronics Co., Ltd., Suwon-si (KR)

(72) Inventors: Pingjun Li, Beijing (CN); Yi Zhou, Beijing (CN); Byung In Yoo, Seoul (KR); Hana Lee, Suwon-si (KR); Hui Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 17/547,767

(22) Filed: Dec. 10, 2021

(65) Prior Publication Data

US 2022/0189031 A1   Jun. 16, 2022

(30) Foreign Application Priority Data

Dec. 11, 2020   (CN) .......................... 202011457838.5
Oct. 12, 2021   (KR) ........................ 10-2021-0135124

(51) Int. Cl.
  *G06T 7/11*    (2017.01)
  *G06N 3/045*   (2023.01)
  *G06T 7/187*   (2017.01)

(52) U.S. Cl.
  CPC ............... *G06T 7/11* (2017.01); *G06T 7/187* (2017.01); *G06N 3/045* (2023.01)

(58) Field of Classification Search
  CPC ........... G06T 7/11; G06T 7/187; G06N 3/045; G06N 20/00; G06V 10/26; G06V 20/56
  See application file for complete search history.

(56) References Cited

FOREIGN PATENT DOCUMENTS

| CN | 111507993 A | 8/2020 |
| KR | 10-2030027 B1 | 10/2019 |

OTHER PUBLICATIONS

Weakly- and Semi-Supervised . . . , Li et al, 2019; https://arxiv.org/pdf/1808.03575.pdf (Year: 2019).*
Instance-aware_Semantic_Segmentation__Dai_et_al__2015; https://arxiv.org/pdf/1512.04412.pdf (Year: 2015).*
Loss Functions, MLG, Jan. 2020; https://web.archive.org/web/20200108152733/https://ml-cheatsheet.readthedocs.io/en/latest/loss_functions.html (Year: 2020).*
Budvytis, Ignas. "Novel Probabilistic Graphical Models for Semi-Supervised Video Segmentation" *Dissertation University of Cambridge, Department of Engineering*. Sep. 2012 (207 pages in English).

(Continued)

*Primary Examiner* — Jianxun Yang
(74) *Attorney, Agent, or Firm* — NSIP Law (57) ABSTRACT

A processor-implemented method includes: determining a probability that a pixel of an input image belongs to each of a plurality of preset categories; and determining a category of the pixel to be a category corresponding to either one or both of a plurality of category areas and a category determined based on the probability that the pixel belongs to each of the preset categories, based on a result of comparing, to a preset threshold value, a probability that the pixel belongs to the category corresponding to the category areas.

14 Claims, 4 Drawing Sheets

(56) References Cited

OTHER PUBLICATIONS

Budvytis, Ignas, et al. "Semi-Supervised Video Segmentation using Tree Structured Graphical Models." *IEEE transactions on pattern analysis and machine intelligence* vol. 35 Issue No. 11 (2013) pp. 2257-2264.

Li, Qizhu, et al. "Weakly-and Semi-Supervised Panoptic Segmentation." *Proceedings of the European conference on computer vision (ECCV)*. 2018 (17 pages in English).

\* cited by examiner

METHOD AND APPARATUS WITH OPTIMIZATION AND PREDICTION FOR IMAGE SEGMENTATION

CROSS-REFERENCE TO RELATED APPLICATIONS

This application claims the benefit under 35 USC § 119(a) of Chinese Patent Application No. 202011457838.5 filed on Dec. 11, 2020 in the China National Intellectual Property Administration and Korean Patent Application No. 10-2021-0135124 filed on Oct. 12, 2021 in the Korean Intellectual Property Office, the entire disclosures of which are incorporated herein by reference for all purposes.

BACKGROUND

1. Field

The following description relates to a method and apparatus with optimization and prediction for image segmentation.

2. Description of Related Art

Image segmentation may be a process of allocating category-representing information to each pixel of a two-dimensional (2D) image. Image segmentation may include a classification task that predicts a category of each pixel. The category task may need to identify a category. That is, pixels represented as the same category may have extremely similar features on the outside, and pixels represented as different categories may have a great difference in their features on the outside. Typical image segmentation may be based on a pixel category uniqueness assumption, the assumption that each pixel belongs to only one category. However, this assumption may lead to inaccurate image segmentation in scenes of a certain type.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes: determining a probability that a pixel of an input image belongs to each of a plurality of preset categories; and determining a category of the pixel to be a category corresponding to either one or both of a plurality of category areas and a category determined based on the probability that the pixel belongs to each of the preset categories, based on a result of comparing, to a preset threshold value, a probability that the pixel belongs to the category corresponding to the category areas.

The determining of the category of the pixel may include: in response to the probability that the pixel belongs to the category corresponding to the category areas being greater than the threshold value, determining the category of the pixel to be the category corresponding to the category areas; and in response to the probability that the pixel belongs to the category corresponding to the category areas being less than or equal to the threshold value, determining the category of the pixel based on the probability that the pixel belongs to each of the preset categories.

A multi-category image may be determined based on the input image, a first pixel classifier may be optimized using the multi-category image, the optimized first pixel classifier may be used to determine the probability that the pixel of the input image belongs to each of the plurality of preset categories, and a pixel of the multi-category image may have at least two categories in the plurality of category areas.

In another general aspect, one or more embodiments include a non-transitory computer-readable storage medium storing instructions that, when executed by a processor, configure the processor to perform any one, any combination, or all operations and methods described herein.

In another general aspect, a system may include at least one computing device and at least one storage device configured to store therein instructions, wherein, when executed by the computing device, the instructions configure the computing device to perform any one, any combination, or all operations and methods described herein.

In another general aspect, a processor-implemented method includes: determining a multi-category image; and optimizing a first pixel classifier using the multi-category image, wherein a pixel of the multi-category image corresponds to two or more categories in a plurality of category areas.

The determining of the multi-category image may include: obtaining a single category image in which a pixel corresponds to one first category in the category areas; and allocating a second category to the pixel in the category areas in the single category image to determine the multi-category image.

The allocating of the second category may include: predicting a probability that each pixel of the single category image belongs to each of a plurality of preset categories, using a second pixel classifier; and determining a second category of each pixel based on a probability that each pixel belongs to another category excluding the first category from among categories of each pixel in the category areas.

The allocating of the second category may include: determining a new single category image by removing the first category of the category areas from the single category image; optimizing a second pixel classifier using a pixel represented as a category in the new single category image; and predicting a probability that a pixel in the category areas in the single category image belongs to another category excluding the first category from among a plurality of preset categories using the optimized second pixel classifier, and determining a second category of the pixel in the category areas based on a result of the predicting.

The method may include optimizing the first pixel classifier based on a loss function, wherein the loss function is $L_{div} = -\Sigma_{k=0}^{N-1} y_k \ln \tilde{y}_k$, where $L_{div}$ denotes a loss of the pixel, N denotes the number of preset categories, k indicates a kth category among the N categories, $y_k$ indicates whether an actual category of the pixel may include the kth category, and $\tilde{y}_k$ denotes a probability that a predicted category of the pixel has the kth category.

The multi-category image may be determined based on an input image, and the method may include: determining a probability that a pixel of the input image belongs to each of a plurality of preset categories; and determining a category of the pixel of the input image to be a category corresponding to the plurality of category areas or a category determined based on the probability that the pixel belongs to each of the preset categories, based on a result of comparing, to a preset threshold value, a probability that the pixel belongs to the category corresponding to the category areas.

In another general aspect, an apparatus includes: one or more processors configured to: determine a probability that a pixel of an input image belongs to each of a plurality of preset categories; and determine a category of the pixel to be either one or both of a category corresponding to a plurality of category areas and a category determined based on the probability that the pixel belongs to each of the preset categories, based on a result of comparing a probability that the pixel belongs to the category corresponding to the category areas to a preset threshold value.

In another general aspect, an apparatus includes: one or more processors configured to: determine a multi-category image; and optimize a first pixel classifier using the multi-category image, wherein a pixel of the multi-category image has at least two categories in a plurality of category areas.

In another general aspect, a processor-implemented method includes: obtaining a single category image in which each pixel is determined to correspond to a single category among preset categories; determining, based on the single category image, a multi-category image in which at least one pixel is determined to correspond to a plurality of categories among the preset categories; and optimizing a first pixel classifier based on the multi-category image.

A pixel of the single category image may be determined to correspond to a first category among the preset categories and is in a plurality of category areas, and the determining of the multi-category image may include determining the pixel to further correspond to a second category among the preset categories.

The determining the pixel to further correspond to the second category may include: dividing the category areas in the single category image into a connection area; determining a pixel ratio of each of second categories in the connection area; and determining the second category for the pixel from among the second categories, based on the calculated pixel ratios.

The determining of the second category for the pixel among the second categories may include determining the second category to be one the second categories in response to the pixel ratio of the one of the second categories being either one or both of greater than or equal to a preset ratio and a greatest value among the pixel ratios.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, each of expressions, for example, "between" and "immediately between" and "adjacent to" and "immediately adjacent to," should also be respectively construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Figure 1A:
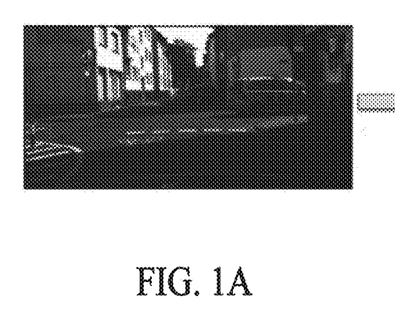
FIGS. 1A and 1B illustrate an example of image segmentation.
Figure 1B:
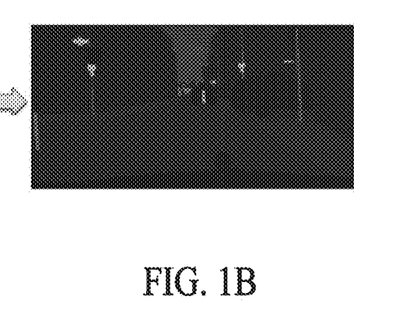
Figure 2A:
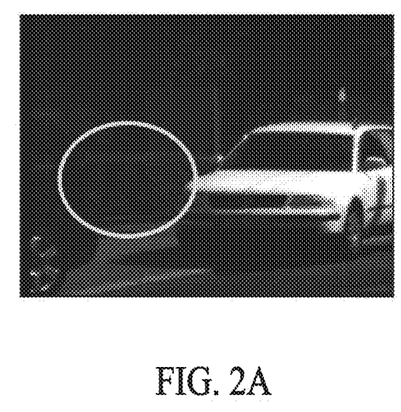
FIGS. 2A and 2B illustrate an example of image segmentation performed when a pixel category uniqueness assumption is not satisfied.
Figure 2B:
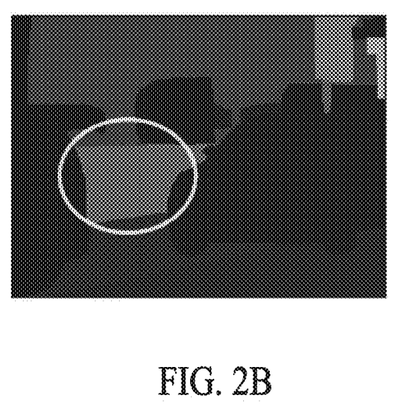

FIGS. 1A and 1B illustrate an example of image segmentation. FIGS. 2A and 2B illustrate an example of image segmentation performed when a pixel category uniqueness assumption is not satisfied.

FIGS. 1A and 1B illustrate an example of typical image segmentation. FIG. 1A is an original input image, and FIG. 1B is a resultant image obtained from image segmentation. In the image of FIG. 1B, pixels in the same color block may belong to the same category. For example, under the assumption that an input image of an image segmentation algorithm is x and the size thereof is W*H*3, an output of the image segmentation algorithm may be a Sem image and the size thereof may be W*H. In this example, W denotes a width of the image, H denotes a height of the image, and 3 indicates the presence of three channels including red (R), green (G), and blue (B) channels in the image. Each pixel of the Sem image and a pixel at the same position in the input image x may correspond to each other, and a pixel value of each pixel may indicate a category of a corresponding pixel of the input image x. A range of pixel values may include 0, 1, 2, . . . , and Last, in which Last corresponds to a value obtained by subtracting 1 from the number N of categories. In general, categories and the number of categories may be defined in advance. For example, when there are five categories including road, sky, building, human, and vehicle, a pixel value of the Sem image may be 0, 1, 2, 3, or 4 which respectively correspond to the predefined five categories.

Typical image segmentation solutions may be based on a pixel category uniqueness assumption, the assumption that each pixel belongs to only one category. However, this assumption may have an issue in scenes of a certain type, a general situation of which is illustrated in FIG. 2A. In FIG. 2A, a circle indicates a scene in which green plants that are commonly found in cities are surrounded by a sparsely-barred fence. In such a semi-occluded scene, a foreground content (i.e., the fence) may not fully occlude a background content (i.e., the green plants). In addition, pixels in the semi-occluded scene (or a semi-occluded content) may have explicit information of the background content, and thus a category of the background content may thus be readily identifiable by humans. However, through typical image segmentation methods, the entire area (for example, including pixels at which the bars of the fence are positioned and pixels at which the green plants are positioned without an obstacle between the bars of the fence) may be inaccurately indicated as a "fence." This situation is illustrated in FIG. 2B.

In a semi-occluded scene illustrated in FIG. 2B, pixels in a corresponding area may have highly similar outside features to those of a category of green plants, although they are indicated as a "fence." Thus, typical image segmentation methods may not easily or accurately determine a category of these pixels. Thus, when using such an image, a classifier may not be trained to a high level of accuracy when the classifier implements the typical image segmentation methods.

In contrast, an image segmentation method and apparatus of one or more embodiments may achieve a higher level of segmentation accuracy even for an image that does not satisfy a pixel category uniqueness assumption.

Figure 3:
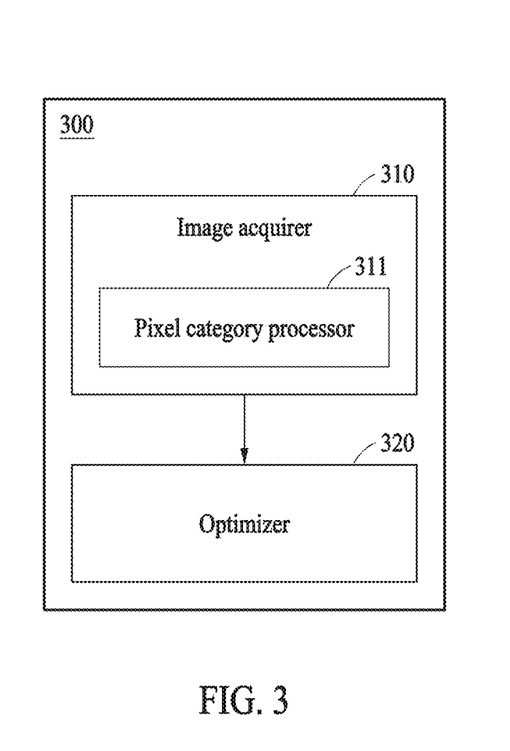
FIG. 3 illustrates an example of an optimization apparatus for image segmentation.

FIG. 3 illustrates an example of an optimization apparatus for image segmentation.

Referring to FIG. 3, an optimization apparatus 300 may include an image acquirer 310 and an optimizer 320. The image acquirer 310 may be or include one or more image sensors (e.g., one or more cameras). The image acquirer 310 may obtain a multi-category image. The optimizer 320 may determine a parameter of a first pixel classifier by optimizing (e.g., training) the first pixel classifier using the multi-category image. In an example, the first pixel classifier may be used to predict a probability that each pixel of an input image input to the first pixel classifier belongs to each of a plurality of preset categories.

In an example, a pixel of the multi-category image may have at least two categories in a plurality of category areas. That is, when a pixel in the category areas in the multi-category image does not satisfy the uniqueness assumption, the pixel in the category areas may have a plurality of categories instead of one category. An example of this is illustrated in FIGS. 2A and 2B as a semi-occluded area (e.g., an area of a background content that is not fully occluded by a foreground content). Also, a pixel in a single category area in the multi-category images may be represented as one type of a category. However, examples are not limited thereto. In addition to the semi-occluded area, reflective surfaces (e.g., shadows on glass or water), billboards or posters (which belong to a portion of a wall or a building but display other contents), or the like may all be considered image contents in a plurality of category areas. For the convenience of description, the semi-occluded area will be described hereinafter as an example.

In an example, a category to which each pixel of a multi-category image to be used for optimizing the first pixel classifier belongs may be set in advance.

For example, under the assumption that a total of N categories is preset in a scene of an image, each of the categories may be represented by an integer, integers corresponding to the N categories may be, for example, 0, 1, 2, . . . , and N−1, a category to which each pixel belongs may be represented as an N-dimensional vector y, and elements of the vector may be represented by y[i] in which i=0, 1, . . . , and N−1. In this example, y[i] represents a probability that a corresponding pixel belongs to an ith category.

When a pixel has a single category k, an element of a corresponding vector y may be y[k]=1, and all other elements may be 0. That is, only a value of a position corresponding to the category may be 1, and values of all other positions may be 0. Such a vector may be referred to as a one-hot vector. For example, under the assumption that there are five categories in a scene of an image, which include road=0, sky=1, building=2, human=3, and vehicle=4, a vector y for a pixel in the category of road may be [1, 0, 0, 0, 0], a vector y for a pixel in the category of sky may be [0, 1, 0, 0, 0], a vector y for a pixel in the category of building may be [0, 0, 1, 0, 0], a vector y for a pixel in the category of human may be [0, 0, 0, 1, 0], and a vector y for a pixel in the category of vehicle may be [0, 0, 0, 0, 1].

When a pixel belongs to a plurality of category areas (e.g., a semi-occluded area) and has a plurality of categories, a plurality of y[i] in a corresponding vector y may be greater than 0 and may satisfy 0≤y[i]≤1, and a total sum thereof may be 1. For example, when a pixel has two categories (e.g., a foreground category and a background category), a vector y and element values corresponding to the two categories may be set to be 0.5, respectively.

When the image acquirer 310 obtains only a single category image (for example, from a known dataset Cityscapes) without directly obtaining a multi-category image, that is, when each pixel of the image has only one category (a category of each pixel in the single category image is referred to herein as a first category of a corresponding pixel for the convenience of description), the image acquirer 310 may transform the single category image into a multi-category image and perform optimization (e.g., training) using the first pixel classifier. In an example, the image acquirer 310 may set a pixel category processor 311 to transform a single category image into a multi-category image by allocating a second category to a pixel in a plurality of category areas in the single category image. In this example, the pixel category processor 311 may allocate at least one second category to a pixel in the category areas.

In an example, the pixel category processor 311 may allocate the second category to a pixel in the category areas in the single category image using a fully automatic algorithm or a semi-automatic algorithm, non-limiting examples of which will be described hereinafter, to transform the pixel in the category areas in the single category image into a pixel having a plurality of categories.

Fully Automatic Algorithm

In the fully automatic algorithm, the pixel category processor 311 may predict a category of each pixel of a single category image using a second pixel classifier, and determine a probability that each pixel belongs to each of a plurality of preset categories. Based on a probability of another category, excluding a first category, among predicted categories of each pixel in a plurality of category areas, the pixel category processor 311 may determine a second category of each pixel. For example, the pixel category processor 311 may determine, to be a second category of a pixel, a preset number of categories in an order of the highest probability, excluding the first category from among categories of the pixel in the category areas predicted based on a result of the predicting. For example, when categories of each pixel are limited to a maximum of two, for each pixel in the category areas, the pixel category processor 311 may determine, to be a second category of a pixel, one category having the highest probability among other categories, excluding a first category of the pixel, among the preset categories. For another example, when categories of each pixel are limited to a maximum of three, for each pixel in the category areas, the pixel category processor 311 may determine, to be a second category of a pixel, first two categories having the highest probability among other categories, excluding a first category of the pixel, among the preset categories.

Alternatively or additionally, after allocating a second category to a pixel in the category areas, the pixel category processor 311 may further divide the category areas in the single category image into at least one connection area, calculate a pixel ratio of each second category in each connection area, and set a second category for all pixels in a corresponding connection area based on the calculated pixel ratio. For example, the pixel category processor 311 may set, to be a second category for all pixels in the connection areas, a preset number of categories in an order from the greatest ratio to the smallest ratio in the second category in which the ratio exceeds a preset ratio (e.g., 0.37).

For example, when categories of each pixel are limited to a maximum of two, the pixel category processor 311 may determine, to be a second category of each pixel in a corresponding connection area, a second category that occupies the greatest proportion in the connection area, regardless of a second category originally allocated to each pixel in the connection area. For example, when categories of each pixel are limited to a maximum of three, the pixel category processor 311 may determine, to be a second category of each pixel in a corresponding connection area, first two second categories that occupy the greatest proportion in the connection area, regardless of a second category originally allocated to each pixel in the connection area. In addition, when a pixel ratio of each second category in a connection area does not exceed a preset ratio, the pixel category processor 311 may set, to be an unknown category, a second category of all pixels in the connection area.

Semi-Automatic Algorithm

In the semi-automatic algorithm, the pixel category processor 311 may obtain a new single category image by removing a first category of a plurality of category areas from a single category image. The pixel category processor 311 may optimize (e.g., train) a second pixel classifier using pixels represented as a category in the new single category image. Since pixels removed from the first category may no longer be represented as a category, these pixels may not be used to optimize the second pixel classifier.

After completing the optimization, the pixel category processor 311 may predict a probability that each pixel in the category areas in the single category image belongs to another category, excluding the first category removed from a plurality of preset categories, by using the optimized second pixel classifier, and determine a second category of each pixel in the category areas based on a result of the predicting. For example, the pixel category processor 311 may determine, to be a second category of a corresponding pixel, a category for which the predicted probability of each pixel in the category areas is greater than a preset threshold value (e.g., 0.6). In this example, when the predicted probability of each pixel is not greater than the threshold value, a second category of a corresponding pixel may be set to be an unknown category.

Alternatively or additionally, before optimizing the second pixel classifier, the pixel category processor 311 may directly represent (or manually represent), as a second category, a pixel in a portion of a plurality of category areas in the single category image or the new single category image. For example, before removing a first category in the category areas from the single category image, the pixel category processor 311 may replace the first category by representing the pixel in the portion of the category areas as the second category. Through this, the represented second category may be used as a sole category of the pixel in the portion of the category areas for optimizing the second pixel classifier. Here, the original first category of this pixel may be removed. Thus, the pixel may participate in the optimization of the second pixel classifier, and a category of a pixel in another portion of the category areas, which is not represented as the second category, may be set to be an unknown category such that the pixel does not participate in the optimization of the second pixel classifier.

Alternatively or additionally, the pixel category processor 311 may further improve the prediction accuracy by predicting a second category of a pixel in a plurality of category areas and correcting a prediction result based on neighboring pixels using a majority scheme, as described above.

In an example, as the second classifier used for the fully automatic algorithm and semi-automatic algorithm, various classifiers may be used to predict a pixel category of a single category image, and a detailed description thereof will be omitted here.

In addition, after obtaining a multi-category image through the fully automatic algorithm and the semi-automatic algorithm, the optimizer 320 may optimize a first pixel classifier based on a preset loss function, and determine various parameters of the first pixel classifier through this. For example, the optimizer 320 may calculate a loss of each pixel having no unknown category in the multi-category image, and determine, to be a final (e.g., trained, learned, and/or optimized) parameter of the first pixel classifier, a parameter of the first pixel classifier that minimizes a statistical value (e.g., a mean value, a median value, etc.) of losses of all pixels without the unknown category in the multi-category image. In an example, when a second category of some pixels in a plurality of category areas in the multi-category image is set as the unknown category, a corresponding category vector y may not be known, and thus a corresponding loss may not be calculated using the loss function. Thus, such pixels may not be used to train the pixel classifier.

In an example, the loss function may be represented by Equation (1) below, for example.

Equation (1):

$$L_{div} = -\Sigma_{k=0}^{N-1} y_k \ln \tilde{y}_k \quad (1)$$

In Equation (1) above, $L_{div}$ denotes a loss of a pixel, and N denotes the number of preset categories, and k indicates a kth category among the N categories. $y_k$ indicates whether the kth category is included in an actual category of the pixel and whether it has the same meaning and value as y[k]. $\tilde{y}_k$ indicates a probability that a predicted category of the pixel is the kth category.

The first pixel classifier obtained by the optimization apparatus 300 may be provided to, or included in, a prediction apparatus 400 to be described hereinafter with reference to FIG. 4 such that it predicts a category of each pixel of an image to be processed for the implementation of image segmentation. Such a prediction operation will be described in detail hereinafter.

Figure 4:
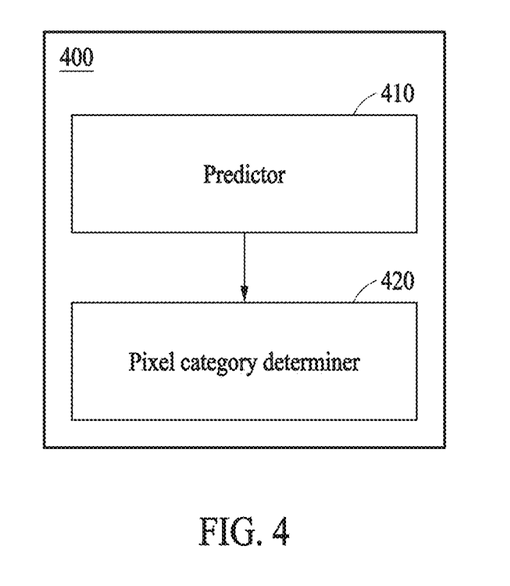
FIG. 4 illustrates an example of a prediction apparatus for image segmentation.

FIG. 4 illustrates an example of a prediction apparatus for image segmentation.

Referring to FIG. 4, the prediction apparatus 400 may include a predictor 410 and a pixel category determiner 420. The predictor 410 may obtain (or predict) a probability that each pixel in an input image belongs to each of a plurality of preset categories. For example, the predictor 410 may predict a probability that each pixel of the input image belongs to each of the preset categories using a first pixel classifier optimized by the optimization apparatus 300.

The pixel category determiner 420 may determine a category of each pixel of the input image based on a result of the prediction performed by the predictor 410. In an example, based on a result of comparing, to a preset threshold value, a probability that a pixel belongs to a category corresponding to a plurality of category areas, the pixel category determiner 420 may determine a category of the pixel to be the category corresponding to the category areas or a category determined based on the probability that each pixel belongs to each of the preset categories.

For example, the pixel category determiner 420 may determine a corresponding category type (i, j) for a pixel (i, j) of an input image using Equation (2) below, for example.

Equation (2)

$$ype(i, j) = \begin{cases} HOC, & \text{if}Pred[i][j][HOC] > \text{threshold} \\ \text{argmax}_k \{Pred[i][j][k], k = 0, \ldots, N-1\} \end{cases}, \text{etc.} \quad (2)$$

In Equation (2) above, N denotes the number of preset categories, and k indicates a kth category among the N categories. HOC indicates a category corresponding to a plurality of category areas (e.g., semi-occluded areas) and one of the preset categories. threshold denotes a preset threshold value (e.g., 0.3). Pred[i][j][HOC] denotes a probability that a pixel predicted using the first pixel classifier belongs to the category areas, and Pred[i][j][k] denotes a probability that the pixel predicted using the first pixel classifier belongs to the kth category among the preset N categories. In addition, in an example, which one of the preset categories is the category corresponding to the category areas may be determined.

Referring to Equation (2) above, when the probability that the pixel belongs to the category corresponding to the category areas is greater than the preset threshold value, the pixel category determiner 420 may determine a category of the pixel to be the category corresponding to the category areas. In contrast, when the probability that the pixel belongs to the category corresponding to the category areas is less than or equal to the preset threshold value, the pixel category determiner 420 may determine a category of the pixel based on the probability that the pixel belongs to each of the preset categories. For example, the pixel category determiner 420 may determine the category of the pixel to be a category having the highest probability among the preset categories.

Thus, the prediction apparatus 400 may determine or predict a category of each pixel of an input image, and allow image segmentation to be implemented based on a result of the prediction.

Figure 5:
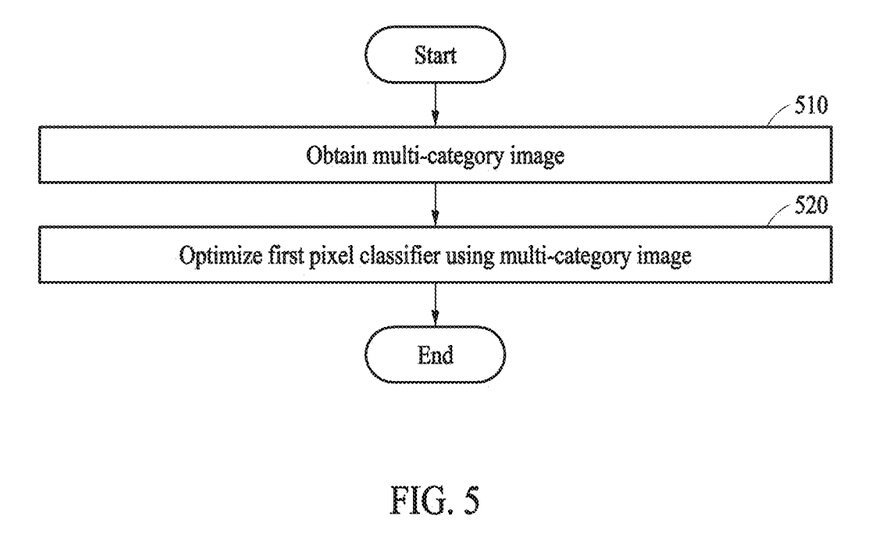
FIG. 5 illustrates an example of an optimization method for image segmentation.

FIG. 5 illustrates an example of an optimization method for image segmentation.

Referring to FIG. 5, in operation 510, the image acquirer 310 may obtain a multi-category image. Each pixel in the multi-category image may have at least two categories in a plurality of category areas.

In an example, when the image acquirer 310 does not directly obtain a multi-category image, but obtains a single category image, the image acquirer 310 may further allocate a second category to a pixel in a plurality of category areas in the single category image using the pixel category processor 311 included in the image acquirer 310, and transform the single category image to a multi-category image to optimize a first pixel classifier, in operation 510. In an example, the pixel category processor 311 may allocate a second category to a pixel in the category areas using either one or both of the fully automatic algorithm and the semi-automatic algorithm that are described above. A detailed description thereof will thus be omitted here for the convenience of description.

In operation 520, the optimizer 320 may determine a parameter of the first pixel classifier by optimizing the first pixel classifier using the multi-category image provided by the image acquirer 310.

For example, the optimizer 320 may determine the parameter of the first pixel classifier to be used for a subsequent prediction operation based on a loss function. The loss function is described above, and thus a more detailed description thereof will be omitted here.

Figure 6:
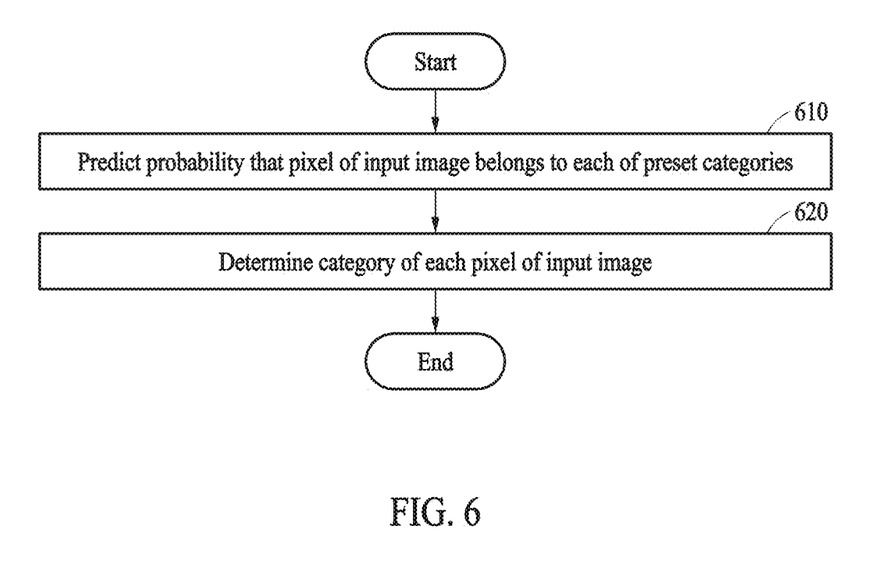
FIG. 6 illustrates an example of a prediction method for image segmentation.

FIG. 6 illustrates an example of a prediction method for image segmentation.

Referring to FIG. 6, in operation 610, the predictor 410 may obtain a probability that each pixel of an input image belongs to each of a plurality of preset categories. In an example, the predictor 410 may predict the probability that each pixel of the input image belongs to each of the preset categories using a first pixel classifier that is optimized through the optimization method described above.

In operation 620, the pixel category determiner 420 may determine a category of each pixel of the input image based on a result of a prediction performed by the predictor 410. For example, based on a result of comparing a probability that a pixel belongs to a category corresponding to a plurality of category areas to a preset threshold value, the pixel category determiner 420 may determine a category of the pixel to be the category corresponding to the category areas or a category determined based on the probability that the pixel belongs to each of the preset categories.

In an example, when the probability that the pixel belongs to the category corresponding to the category areas is greater than the preset threshold value, a category of the pixel may be determined to be the category corresponding to the category areas. In contrast, when the probability that the pixel belongs to the category corresponding to the category areas is less than or equal to the preset threshold value, a category of the pixel may be determined based on the probability that the pixel belongs to each of the preset categories. For example, the category of the pixel may be determined to be a category having the highest probability among the preset categories. Thus, a category of each pixel in an input image may be determined as described above, and image segmentation may be implemented based on a result of a prediction performed as described above.

According to example embodiments described herein, an optimization apparatus and method for image segmentation of one or more embodiments and a prediction apparatus and method for image segmentation of one or more embodiments may effectively improve the accuracy in image segmentation even for an image that does not satisfy a pixel category uniqueness assumption, and may improve the performance of an image segmentation algorithm while reducing a learning difficulty of the image segmentation algorithm.

Of the optimization apparatus and method for image segmentation and the prediction apparatus and method for image segmentation, a method of predicting a pixel category may use image data as input data for artificial intelligence (AI) and obtain a category of each pixel in an image as output data. In addition, a processor or processing device for executing the method may perform a preprocessing operation on the data to convert the data into a form suitable to be used as an input to an AI model.

The AI model may be obtained through training. The obtaining through training may be construed as obtaining a predefined operation rule or AI model that is configured to perform a desired feature (or goal) by training a basic AI model with a plurality of sets of training data through a training algorithm.

The AI model may include a plurality of neural network layers, and each of the layers may include a plurality of weight values, and a neural network computation may be performed by a calculation between a calculation result from a previous layer and a plurality of weight values.

Figure 7:
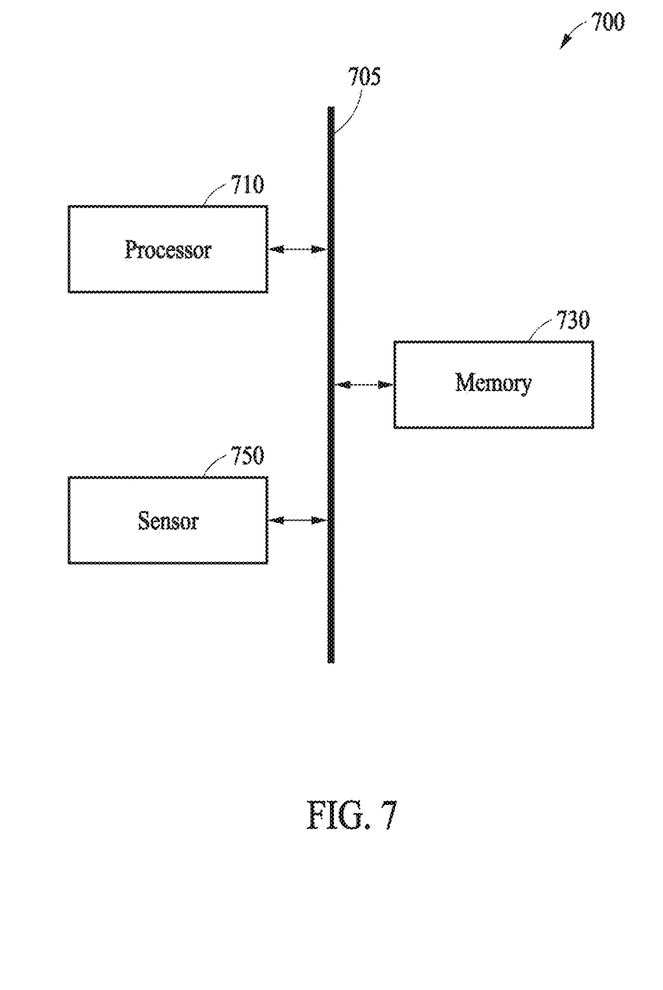
FIG. 7 illustrates an example of an electronic apparatus.

FIG. 7 illustrates an example of an electronic apparatus.

Referring to FIG. 7, an electronic apparatus 700 may be or include an optimization apparatus (for example, the optimization apparatus 300 of FIG. 3) and/or a prediction apparatus (for example, the prediction apparatus 400 of FIG. 4) described herein, as non-limiting examples. The electronic apparatus 700 may be configured to perform one or more or all steps, operations, or methods described above with reference to FIGS. 1 through 6.

The electronic apparatus 700 may be a computing device. The electronic apparatus 700 may be, for example, a personal computer (PC), an advanced driver assistance system (ADAS), a head-up display (HUD) device, a camera, a 3D digital information display (DID), a navigation device, a neuromorphic device, a 3D mobile device, a smartphone, a smart television (TV), a smart vehicle, an internet of things (IoT) device, a medical device, or the like. The 3D mobile device may include, for example, a display device configured to display AR, virtual reality (VR), and/or mixed reality (MR), a head-mounted display (HMD), a face-mounted display (FMD), and AR glasses.

The electronic apparatus 700 may include a processor 710 (e.g., one or more processors), a memory 730 (e.g., one or more memories), and a sensor 750 (e.g., one or more sensors). These components of the electronic apparatus 700 may communicate with one another through a communication bus 705.

The processor 710 may control an overall operation of the electronic apparatus 700 and implement operations or methods by execution of instructions stored in the memory 730. The processor 710 may include the image acquirer 310, the pixel category processor 311, the optimizer 320, the predictor 410, and the pixel category determiner 420, described above, as a non-limiting example. The processor 710 may be configured to perform one or more or all steps, operations, or methods described above with reference to FIGS. 1 through 6. For example, the processor 710 may determine a category of a pixel and optimize a first pixel classifier and a second pixel classifier.

The memory 730 may store information used by the processor 710 to perform operations. For example, the memory 730 may store instructions, which when executed by the processor 710, configure the processor to perform one or more or all steps, operations, or methods described above with reference to FIGS. 1 through 6, as well as related information for the execution of other functions or other applications of the electronic apparatus 700. The memory 730 may include, as a memory, an RAM, a DRAM, an SRAM, and other types of nonvolatile memory that are known in the related technical field. In addition, the memory 730 may be a computer-readable storage medium or device, such as, for example, a storage, a magnetic hard disk, an optical disc, a flash memory device, and the like.

The sensor 750 may be or include all or a portion of the image acquirer 310 of FIG. 3, in an example. For example, the image acquirer 310 may include one or more image sensors (e.g., one or more cameras), and the sensor 750 may be the one or more image sensors.

The optimization apparatuses, image acquirers, pixel category processors, optimizers, prediction apparatuses, predictors, pixel category determiners, electronic apparatuses, communication buses, processors, memories, sensors, optimization apparatus 300, image acquirer 310, pixel category processor 311, optimizer 320, prediction apparatus 400, predictor 410, pixel category determiner 420, electronic apparatus 700, communication bus 705, processor 710, memory 730, sensor 750, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, comprising:
in response to a probability that a pixel of an input image belongs to a plurality of category areas being greater than a threshold value, determining a category of the pixel to be a category corresponding to the plurality of category areas using an optimized second pixel classifier, wherein the second pixel classifier is optimized using a new single category image determined by removing a first category of the category areas from the single category image; and
in response to the probability being less than or equal to the threshold value,
determining a probability that the pixel belongs to a preset category, for each of a plurality of preset categories; and
determining the category of the pixel to be a category determined based on the probabilities determined for each of the preset categories.

2. The method of claim 1, wherein
a multi-category image is determined based on the input image,
a first pixel classifier is optimized using the multi-category image,
the optimized first pixel classifier is used to determine the probability that the pixel of the input image belongs to each of the plurality of preset categories, and
a pixel of the multi-category image has at least two categories in the plurality of category areas.

3. A processor-implemented method, comprising:
determining a multi-category image using an optimized second pixel classifier, wherein the second pixel classifier is optimized using a new single category image determined by removing a first category of a plurality of category areas from the single category image; and
optimizing a first pixel classifier using the multi-category image,
wherein a pixel of the multi-category image is determined to correspond to two or more categories in the category areas in response to a probability that the pixel belongs to the category areas being greater than a threshold value.

4. The method of claim 3, wherein the determining of the multi-category image comprises:
obtaining the single category image in which a pixel corresponds to the first category in the category areas; and
allocating a second category to the pixel in the category areas in the single category image to determine the multi-category image.

5. The method of claim 4, wherein the allocating of the second category comprises:
predicting a probability that each pixel of the single category image belongs to each of a plurality of preset categories, using the second pixel classifier; and
determining a second category of each pixel based on a probability that each pixel belongs to another category excluding the first category from among categories of each pixel in the category areas.

6. The method of claim 4, wherein the allocating of the second category comprises:
optimizing the second pixel classifier using a pixel represented as a category in the new single category image; and
predicting a probability that a pixel in the category areas in the single category image belongs to another category excluding the first category from among a plurality of preset categories using the optimized second pixel classifier, and determining a second category of the pixel in the category areas based on a result of the predicting.

7. The method of claim 3, further comprising:
optimizing the first pixel classifier based on a loss function,
wherein the loss function is $L_{div} = -\Sigma_{k=0}^{N-1} y_k \ln \hat{y}_k$, where $L_{div}$ denotes a loss of the pixel, N denotes the number of preset categories, k indicates a kth category among the N categories, $y_k$ indicates whether an actual category of the pixel comprises the kth category, and $\hat{y}_k$ denotes a probability that a predicted category of the pixel has the kth category.

8. The method of claim 3,
wherein the multi-category image is determined based on an input image,
and further comprising:
determining a probability that a pixel of the input image belongs to each of a plurality of preset categories; and
determining a category of the pixel of the input image to be a category corresponding to the plurality of category areas or a category determined based on the probability that the pixel belongs to each of the preset categories, based on a result of comparing, to a preset threshold value, a probability that the pixel belongs to the category corresponding to the category areas.

9. An apparatus, comprising:
one or more processors configured to:
in response to a probability that a pixel of an input image belongs to a plurality of category areas being greater than a threshold value, determine a category of the pixel to be the category corresponding to the plurality of category areas using an optimized second pixel classifier, wherein the second pixel classifier is optimized using a new single category image determined by removing a first category of the category areas from the single category image; and
in response to the probability being less than or equal to the threshold value,
determine a probability that the pixel belongs to a preset category, for each of a plurality of preset categories; and
determine the category of the pixel to be a category determined based on the probabilities determined for each of the preset categories.

10. An apparatus, comprising:
one or more processors configured to:
determine a multi-category image using an optimized second pixel classifier, wherein the second pixel classifier is optimized using a new single category image determined by removing a first category of a plurality of category areas from the single category image; and
optimize a first pixel classifier using the multi-category image,
wherein a pixel of the multi-category image is determined to have at least two categories in the category areas in response to a probability that the pixel belongs to the category areas being greater than a threshold value.

11. A processor-implemented method, comprising:
obtaining a single category image in which each pixel is determined to correspond to a single category among preset categories;

in response to a pixel ratio of one of second categories among the preset categories being either one or both of greater than or equal to a preset ratio and a greatest value among pixel ratios, determining, based on the single category image, a multi-category image in which at least one pixel is determined to correspond to a plurality of categories among the preset categories using an optimized second pixel classifier, wherein the second pixel classifier is optimized using a new single category image determined by removing a first category of a plurality of category areas from the single category image; and optimizing a first pixel classifier based on the multi-category image.

12. The method of claim 11, wherein a pixel of the single category image is determined to correspond to a first category among the preset categories and is in the category areas, and the determining of the multi-category image comprises determining the pixel to further correspond to a second category among the preset categories.

13. The method of claim 12, wherein the determining the pixel to further correspond to the second category comprises:

dividing the category areas in the single category image into a connection area;

determining the pixel ratio of each of the second categories in the connection area; and determining the second category for the pixel from among the second categories, based on the calculated pixel ratios.

14. The method of claim 13, wherein the determining of the second category for the pixel among the second categories comprises determining the second category to be one the second categories in response to the pixel ratio of the one of the second categories being either one or both of greater than or equal to the preset ratio and the greatest value among the pixel ratios.

* * * * *